US012465150B2

(12) United States Patent
Scheider

(10) Patent No.: US 12,465,150 B2
(45) Date of Patent: Nov. 11, 2025

(54) TRUE PURE PRONE POSITIONING MATTRESS FOR THE TREATMENT OF OBSTRUCTIVE SLEEP APNEA

(71) Applicant: Dale Michael Scheider, Garden Grove, CA (US)

(72) Inventor: Dale Michael Scheider, Garden Grove, CA (US)

( * ) Notice: Subject to any disclaimer, the term of this patent is extended or adjusted under 35 U.S.C. 154(b) by 138 days.

(21) Appl. No.: 18/445,454

(22) Filed: Aug. 28, 2023

(65) Prior Publication Data

US 2025/0072627 A1 Mar. 6, 2025

(51) Int. Cl.
*A47C 20/02* (2006.01)
*F16M 11/38* (2006.01)

(52) U.S. Cl.
CPC ........... *A47C 20/026* (2013.01); *F16M 11/38* (2013.01)

(58) Field of Classification Search
CPC ....... A47C 20/026; A47C 16/00; F16M 11/38
USPC ............................................................. 5/640
See application file for complete search history.

(56) References Cited

U.S. PATENT DOCUMENTS 217,459 A 7/1879 Harrigan
245,395 A 8/1881 Perkins
307,520 A 11/1884 Bunting, Jr.
2,556,629 A 6/1951 O'Brien
2,810,920 A * 10/1957 Carruth ................ A47C 20/026 5/725
2,959,794 A 11/1960 Souleles
3,828,377 A 8/1974 Fary
6,047,420 A 4/2000 Priester-Morris
6,151,734 A * 11/2000 Lawrie ................ A47C 20/026 5/643
6,230,350 B1 * 5/2001 Goldstein ............ A47G 9/1054 5/636
7,017,213 B2 3/2006 Chisari
8,011,047 B2 * 9/2011 Mandelzis ........... A47C 20/026 5/725

(Continued)

FOREIGN PATENT DOCUMENTS

CN 203400282 1/2014
JP 2011-240098 12/2011

OTHER PUBLICATIONS

Afrashi, Arman; Ucar, Zeynep Zeren., Sleep Breath, "Effect of prone positioning in mild to moderate obstructive sleep apnea," (Jan. 26, 2015).

(Continued)

*Primary Examiner* — David R Hare
*Assistant Examiner* — George Samuel Gines

(57) ABSTRACT

This patent is for a Pure Prone Positioning (PPP) mattress (001) allowing for one or more people to sleep on a bed in the prone position with their face straight into the mattress plane. Structurally the mattress fits within a standard bed footprint and midpoint where the head is normally positioned on the mattress, a cavity of substantial size is designed for placement of a face rest proning assembly to be positioned there. The face rest proning assembly allows for longitudinal and lateral adjustments of the head and neck, and the padded face rest is adjustable to each face width. The face rest proning assembly allows for easy breathing of oxygen and exhalation of carbon dioxide. Since breathing is normal a person can be medicated while sleeping on the PPP mattress.

6 Claims, 10 Drawing Sheets

(56) References Cited

U.S. PATENT DOCUMENTS

2001/0034909 A1* 11/2001 Babbini ............... A47G 9/1063
5/725
2017/0030092 A1* 2/2017 Young ....................... B66F 3/22

OTHER PUBLICATIONS

Khayat, R; Pleister A, Sleep Medicine Clinics, Consequences of Obstructive Sleep Apnea: Cardiovascular Risk of Obstructive Sleep Apnea and Whether Continuous Positive Airway, (Sep. 11, 2015) p. 273-286 https://pubmed.ncbi.nlm.nih.gov/27542874/.

Ravesloot, M. J. L.; Maanen, J. P.; Dun, L.; de Vries, N., Sleep Breath, The undervalued potential of positional therapy in position-dependent snoring and obstructive sleep a, (Oct. 13, 2011) https://pmc.ncbi.nlm.nih.gov/article/MC3575552/.

* cited by examiner

TRUE PURE PRONE POSITIONING MATTRESS FOR THE TREATMENT OF OBSTRUCTIVE SLEEP APNEA

CROSS-REFERENCE TO RELATED APPLICATIONS

This application does not claim the benefit of a provisional patent.

FEDERALLY SPONSORED RESEARCH

None.

SEQUENCE LISTING

None.

BACKGROUND

Prior Art

The following is a tabulation of some prior art that presently appears relevant:

| Patent No. | Kind Code | Issue Date | Patentee |
|---|---|---|---|
| US Patents | | | |
| 2,959,794 | A | Nov. 15, 1960 | Souleles |
| 2009/0217459 | A1 | Sep. 3, 2009 | Rudolph |
| 2021/0307520 | A1 | Oct. 7, 2021 | Batey |
| 7,017,213 | B2 | Mar. 28, 2006 | Chisari |
| 2,556,629 | A | Jun. 12, 1961 | O Brien |
| 3,828,377 | A | Aug. 13, 1974 | Fary |
| 6,047,420 | A | Apr. 11, 2000 | Priester-Morris |
| 2013/0245395 | A1 | Sep. 19, 2013 | Moniri |
| Foreign Patent Documents | | | |
| JP 2011-240098 | A | Dec. 1, 2011 | Unknown |
| CN 203400282 | U | Jan. 22, 2014 | Unknown |

Non-Patent Literature Documents and Evidence https://www.massagetables.com/oakworks_prone_pillow 8-inch×8-inch stainless steel lab jack scissor stand platform.

Afrashi, Arman; Ucar, Zeynep Zeren, *Sleep Breath*, "Effect of prone positioning in mild to moderate obstructive sleep apnea," (Jan. 26, 2015).

Dale M Schneider overnight sleep study results, 51 apneic episodes per hour December 1993.

Khayat, R; Pleister A, *Sleep Medicine Clinics*, "Consequences of Obstructive Sleep Apnea: Cardiovascular Risk of Obstructive Sleep Apnea and Whether Continuous Positive Airway Pressure Reduces that Risk," (Sep. 11, 2015) p 273-286.

Patient interview with Director UCI Medical Center, Sleep Medicine, Rami N Khayat, MD Jan. 4, 2023.

Ravesloot, M. J. L.; Maanen, J. P.; Dun, L.; de Vries, N., *Sleep Breath*, "The undervalued potential of positional therapy in position-dependent snoring and obstructive sleep apnea—a review of the literature," (Oct. 13, 2011).

Patient interview with Jon White MD, spinal surgery specialist, results of MRI Jun. 22, 2022.

Patient procedure on Oak Works proning platform, Asif Jillani MD, orthopedic specialist fluoroscopic-guided procedures Sep. 4, 2022.

BACKGROUND

This patent application relates specifically to a mattress which allows a person to lie with their face straight into the mattress plane or what is referred to as Pure Prone Positioning (PPP) and then sleep in this position. This position is where the neck is "kept in extension in line with the body (180 degree) during sleep," Afrashi, et al page 2. The patient is positioned face-down with their head in a neutral position without excessive flexion, extension, or rotation of the head and neck. Normally when a human sleeps on their stomach in a prone position they must turn their head, with a PPP mattress they do not have to.

Humans are one of the few mammals which sleep on their back or supine position. Some in the medical field theorize that is why humans have so many sleep disorders because we are still evolving toward being able to sleep in a supine position. One sleep disorder that affects a diverse segment of the population is Obstructive Sleep Apnea (OSA). This is where a sleeping persons throat collapses and closes completely and they must wake up to begin breathing again. This can happen up to 50 times or more per hour, according to the Dale Schneider overnight sleep study. A popular misconception about OSA is that it is related to obesity. According to Rami N Khayat, MD Director of the UCI sleep medicine center, evidence shows that even with a normal BMI people still suffer from OSA.

It is estimated that 22 million American's suffer from OSA. OSA can have profound negative health consequences over time according to, Khayat, R; Pleister A, *Sleep Medicine Clinics*, "Consequences of Obstructive Sleep Apnea: Cardiovascular Risk of Obstructive Sleep Apnea and Whether Continuous Positive Airway Pressure Reduces that Risk." The gold standard treatment is the Continuous Positive Airway Pressure (CPAP) machine. Unfortunately, about 50% of users reject the CPAP machine within 6 months, it's really tough to sleep with a mask blowing air into your face. These sufferers of OSA are left to other strategies. Unfortunately, other strategies/devices have about the same compliance rates. So many devices are additions beyond the normal parameters of sleeping that they drive non-compliance. They are clumsy, hard to use, and uncomfortable.

There are numerous medical studies which show improvement with OSA symptoms by using positional therapy for mild and medium OSA suffers including Ravesloot, M. J. L. et al; "*The undervalued potential of positional therapy in position-dependent snoring and obstructive sleep apnea—a review of the literature*," and Afrashi et al "*Effect of prone positioning in mild to moderate obstructive sleep apnea*." This therapy concentrates on positioning while sleeping on your side or your stomach by using aids like pillows or proning devices. In fact, Dr Khayat the Director of the UCI sleep medicine center said to me, "Sleeping on your stomach is an excellent strategy, many of my patients do it."

Sleeping on one's stomach on a regular flat mattress forces the sleeper to twist their head to the side. To get comfortable they must use various pillows or foam pads in an attempt to compensate for the neck stress. I did this for years. Still after years of sleeping on my stomach without proper support, I was told by Jon White MD I had developed a "Swan Neck Cervical Deformity." This left me unable to sleep on my stomach while bending my neck. With this type of injury, a person can only sleep on their stomach with a true PPP mattress.

What I needed was a device or mattress which enables a person to sleep prone with their face straight ahead, perpendicular in relation to the mattress, a face rest which conforms to the size of their face and keeps their neck aligned with their spine longitudinally and laterally, fits within a traditional mattress footprint with a headboard and footboard but doesn't require them to operate.

One platform which allows a person to lie on their stomach in a true PPP prone position is the traditional massage table. These are rectangular shaped padded tables with legs and at one end sticking out of the table's plane is a face rest. With the face rest sticking outside of the plane of the bed by about a foot this would not work with a head board. Further a sleeper uses the spaces on the bed beside their head to turn over. A person on a massage table must wiggle down the table until their head is within the table plane. Then they can use their hands to turn over.

Some massage tables have a hole in the table plane where one can put your face through instead of the usual face cradle. These holes work OK on a massage table because the table is only 2 to 3 inches thick, and your mouth hangs down below allowing you to breathe. If the face hole was made on a traditional mattress of 8 to 10 inches thick you would rebreathe your carbon dioxide within seconds. Also, traditional mattress sits on a platform which would block any hole within the mattress. Placing your face in one of these massage table holes you will notice that the forehead is tilted upward, and the neck is not in full alignment. This relates to the size of your belly or human mid-section, because if your mid-section protrudes your face isn't going to lay flat. Since the face rest juts out from the mattress footprint by about a foot, this makes it awkward to use long term in a normal bedroom setting.

For years my sleeping position mirrored the sleeping position in foreign patent JP 2011-240098. The person's head is only supported on the forehead. In subsequent pictures the person uses their arms to support their head. In this position the weight of the head is not completely supported and the effect is for the chin and jaw to pull downward, while the forehead tilts upward in relation to the body. Over time you could damage the vertebrae in your neck, like I did.

U.S. Pat. No. 2,959,794 is a true PPP mattress. It has a hole to put your face in which is one size fits all not considering different face shapes. Routed through the device are tubes leading from the face hole cavity to the outside of the mattress for oxygen exchange. These were referred to as Air Intake Aperture 22 and in my experience this type of air exchange is inadequate. During normal breathing you would begin to rebreathe your own carbon dioxide. Normal breathing is a slow methodical process, it doesn't have the force required to clear the airspace and in your last exhale you leave carbon dioxide within the face cavity.

US2009021745A1 is a PPP mattress. This mattress is an air mattress claim 11 with a "cavity" claim 1 for your face to recline in. It's a one-hole size fits all face cavity not taking into account different face shapes. Throughout the device are tubes and pipes FIGS. 10 & 10A, some with valves, to control the air flow from the person breathing. There is also an environmental insert FIGS. 2 & 6 & 7 which is for filtering air. In one embodiment the mattress is made of "a coiled springs mattress, air can travel from outside through the mesh," 116 FIG. 6. These airflow devices would be difficult to work. The human body breathing normally simply doesn't have the capacity to clear the devices of carbon dioxide. For someone with a swan neck cervical deformity this could be a dangerous bed to sleep on. Too often neck pain is so severe for someone like this, they resort to taking a strong dose of pain medication at bedtime. Without being able to detect the signals of CO2 poisoning (hyperventilating) one could fall off to sleep and have a problem.

US patent 2021/307520A1 is another example of a true PPP mattress. The device fits within a standard bed footprint, with a face removal cushion FIG. 1 104. This opening is a one size fits all face cavity not considering different face shapes. Also, the opening cannot move the head up or down. The drawing assumes your neck will be in alignment. This may be so with a large part of the population but individuals with neck injuries and an extended belly (bodily mid-section) require a slight elevation. When I tried to sleep on a table with a face hole like this my forehead tended to want to elevate creating pressure at the back of the skull, this related to the belly size of the sleeper. In one embodiment it is to raise the mattress 0040 218 "to allow airflow for proning position." Further FIG. 6 states "an environmental view," which purport to show the mattress raised. FIG. 6 does not appear to show the upper portion raised for airflow.

Foreign patent CN202400282U is another patent which is for a PPP mattress. Like the mattress mentioned before no concern is given to the face-hole size or height. Additionally, no contingency is shown for how the person sleeping will breathe.

There are devices when coupled with a bed or other sleeping platform which allow one to sleep in a PPP position. They are typically called proning platforms. One I have used is made by Oak Works. Several medical procedures require proning and during the procedure the proning platform is placed on the table/bed. From there the person lies face down and has the procedure done. The proning platform is in the plane of the bed but since it is on top of the bed it would not work overnight. Most proning platforms have a slant tilt to get your face off the table, including the upper torso. A key point is all proning platforms allow a person to breathe normally without any aid. Also, people can be medicated on this device. Since proning devices sit on top of the mattress plane comfort is an issue which makes it awkward to use long term in a normal bedroom setting. They are outside the normal parameters of sleep comfort and it will drive non-compliance.

U.S. Pat. No. 2,556,629 is another example of a proning device. The structure in FIG. 1 allows for one's head to rest and breathe normally and in FIG. 3 it is adjustable to the size of the face. These allow a person to sleep in a PPP position while the device is on the bed. Since this is a proning device outside the normal parameters of sleep comfort it will drive non-compliance.

U.S. Pat. No. 6,047,420 is a true PPP device which is placed on top of a mattress. The person's head and shoulders are supported yet the legs are not. This is like the Oak Works proning device. This is not something one could sleep comfortably on all night. Since this is a proning device outside the normal parameters of sleep comfort it will drive non-compliance.

U.S. Pat. No. 7,017,213B2 is an example of the kind of pillows used to help with prone sleeping. Still like all pillow devices this is not a true PPP device, it keeps the neck at a comfortable angle. One never gets to a true PPP as the neck is slightly twisted to one side.

US patent 2013/0245395A1 Pillow and Mattress for OSA is an example of a mattress pillow combination for the treatment of OSA. The pillow is "T" shaped claim 1 in various embodiments the head FIGS. 9 & 10 can lay on either side of the pillow. In some instances, FIG. 9A a person's head could slip off to the left, in other instances, FIG. 9B a person's head could slip off to the right. I tried sleeping on a massage table several times, one night while sleeping I rolled over and my head popped out of the face rest and jolted downward off the table. It really hurt.

In claim 10 there are recesses on the side of the mattress FIGS. 20, 21, 22, and 23, in addition in claim 12 there is a recess for the chin. This clearly is not shaped like any regular mattress. Without these embodiments the device will not work as mentioned. In claim 18 FIG. 31 it is shown how to adjust the head rest, "which structure resembling a shelf for the pillow upward and downward motion," without a headboard or other method of hanging the headrest FIG. 12 36 the device will not work. There are circumstances where headboards and footboards are not available, mostly for medical procedures. To be a workable PPP mattress it must be fully self-contained within the footprint of the bed.

Concluding my search I found that there was no device or mattress which enables a person to sleep prone with their face straight ahead, a face rest which conforms to the size of their face and adjusts to keep their neck aligned with their spine longitudinally and laterally, fits within a traditional mattress footprint with a head board and foot board but doesn't require them to operate, and the mattress plane is substantially flat.

SUMMARY

This patent is for a Pure Prone Positioning (PPP) mattress allowing for one or more people to sleep on a bed in the prone position, with their face straight into the mattress plane. Structurally the mattress fits within a standard bed footprint and midpoint where the head is normally positioned on the mattress, a cavity of substantial size is designed for placement of a face rest proning assembly to be positioned at that location. The face rest proning assembly allows for longitudinal and lateral adjustments of the head and neck, and the padded face rest is adjustable to the face width. The face rest proning assembly allows for easy breathing of oxygen and exhalation of carbon dioxide. Since breathing is normal a person can be medicated while sleeping on the PPP mattress. Additionally, since the face rest proning assembly is within the footprint of a normal mattress, a sleeper can easily and safely turn over to reposition their body throughout the night, by simply pulling the pillow to the side exposing the face rest.

DRAWINGS

Figure 7A:
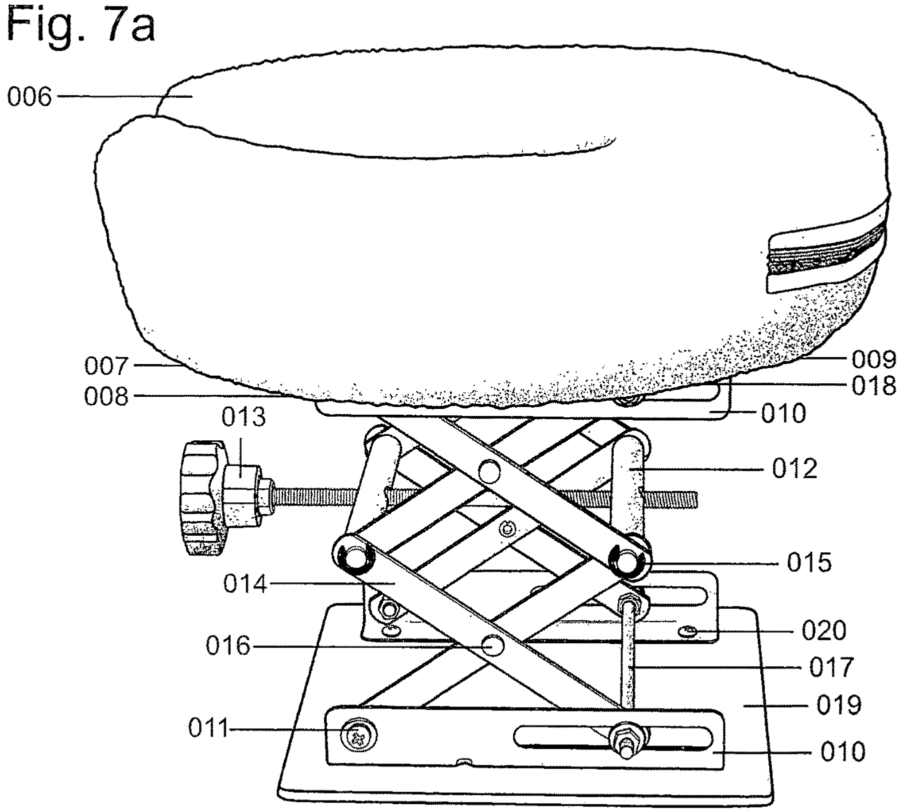

FIG. 7*a* is a perspective view of the face rest assembly.

Figure 7B:
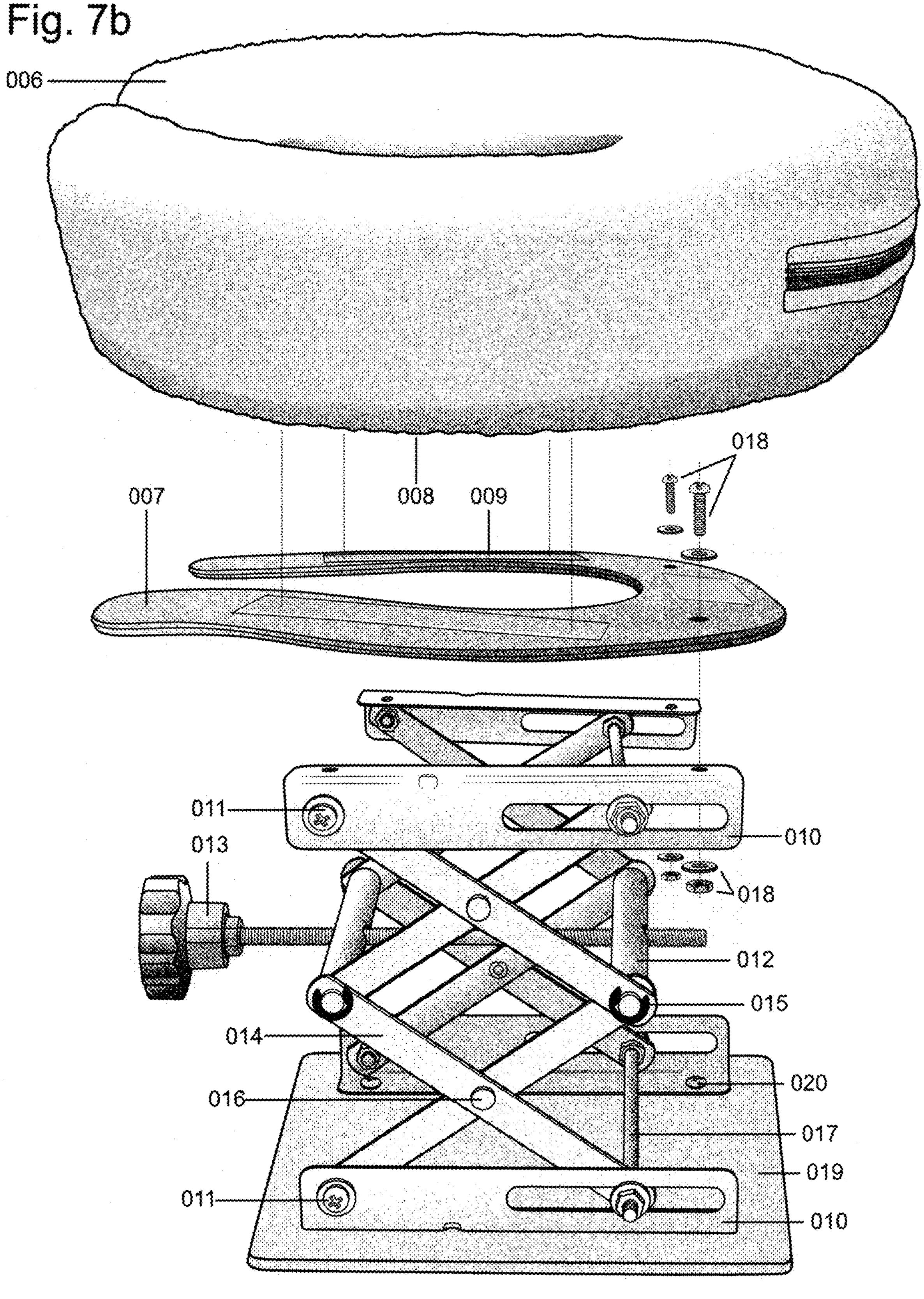

FIG. 7*b* is a perspective exploded view of the face rest assembly.

Figure 8:
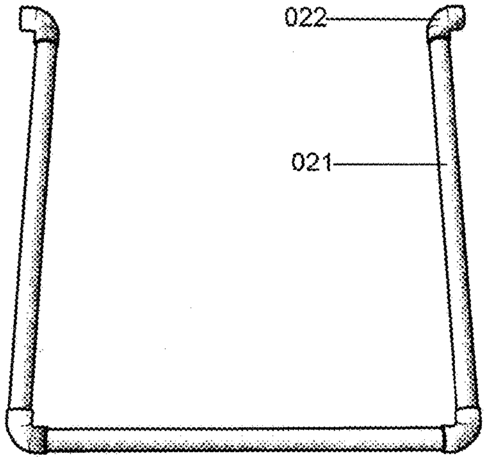

FIG. 8 is a perspective view of the face rest cavity border supports.

Figure 9:
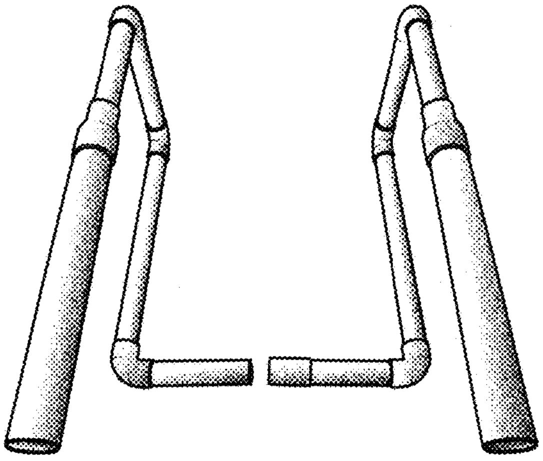

FIG. 9 is a perspective view of the internal face rest support base in two pieces for installation.

Figure 10:
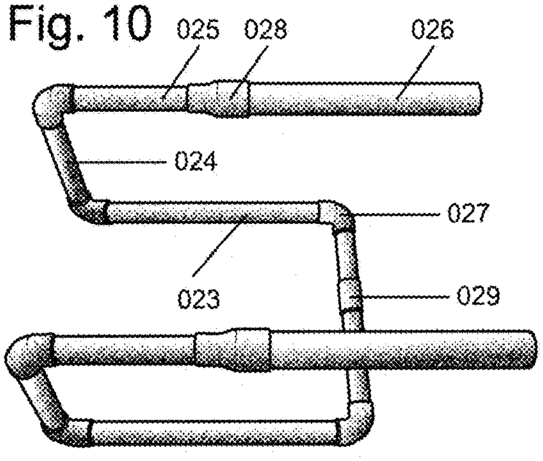

FIG. 10 is a perspective view of the internal face rest support base.

Figure 11:
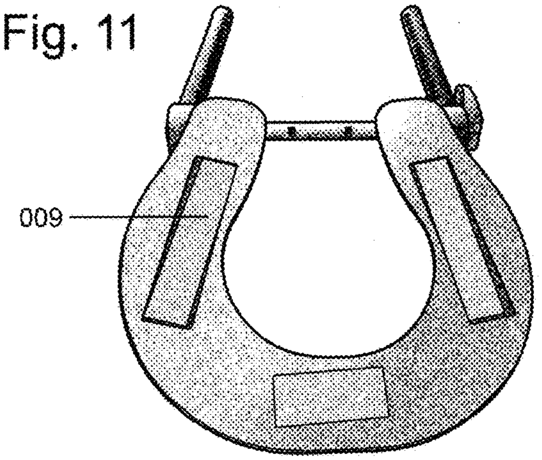

FIG. 11 is a perspective view of a traditional face rest for a massage table with mounting prongs.

Figure 12:
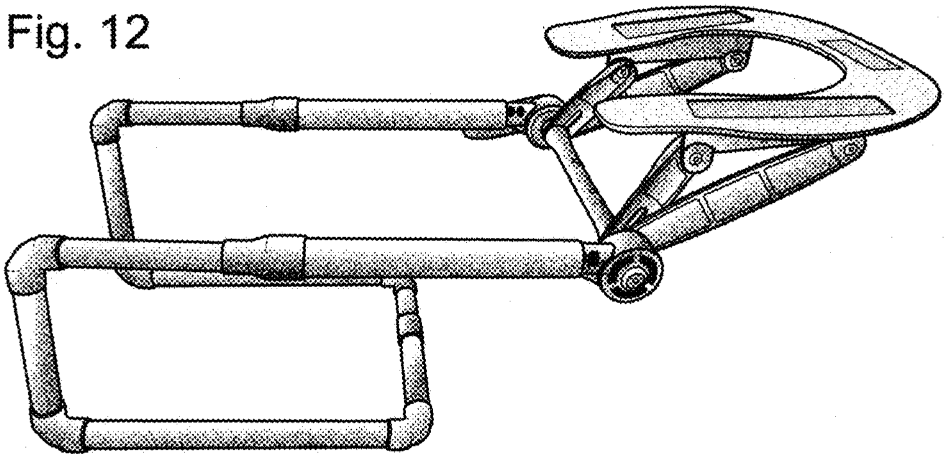

FIG. 12 is a perspective view of the face rest internal support base connected to a massage table face rest.

Figure 13A:
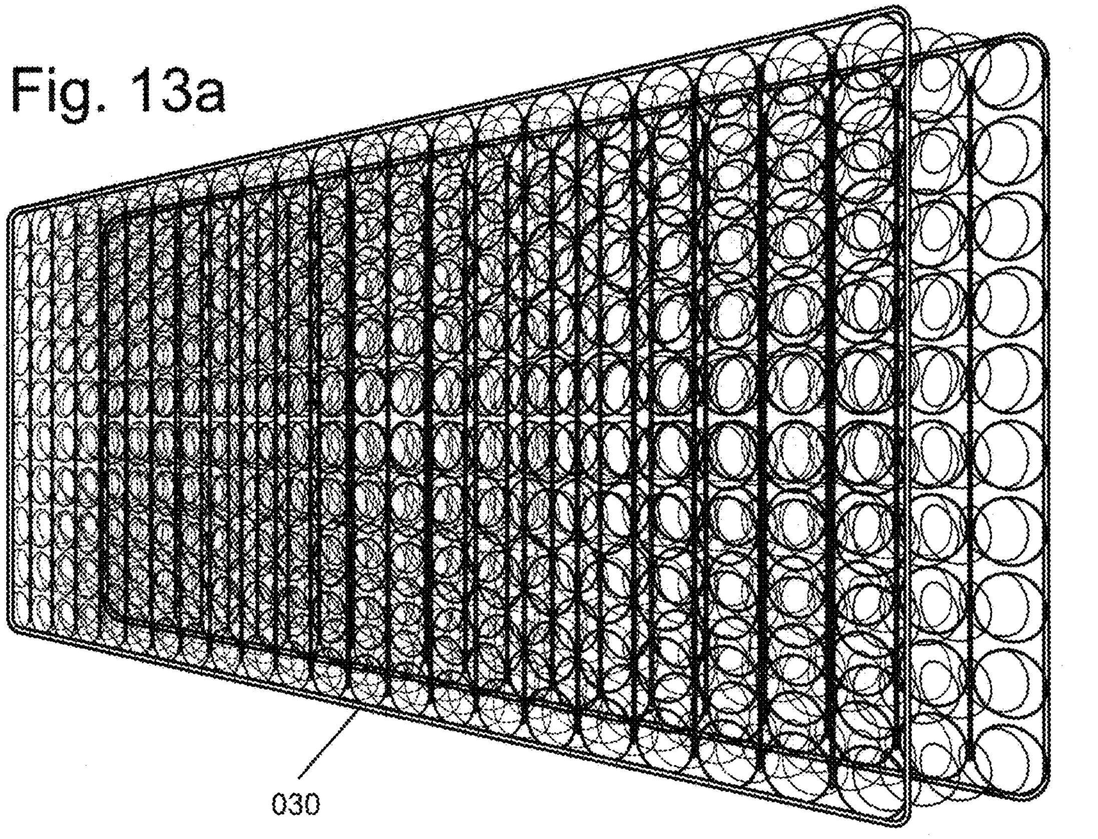

FIG. 13A is a perspective view of an inner spring coil cage mattress.

Figure 13B:
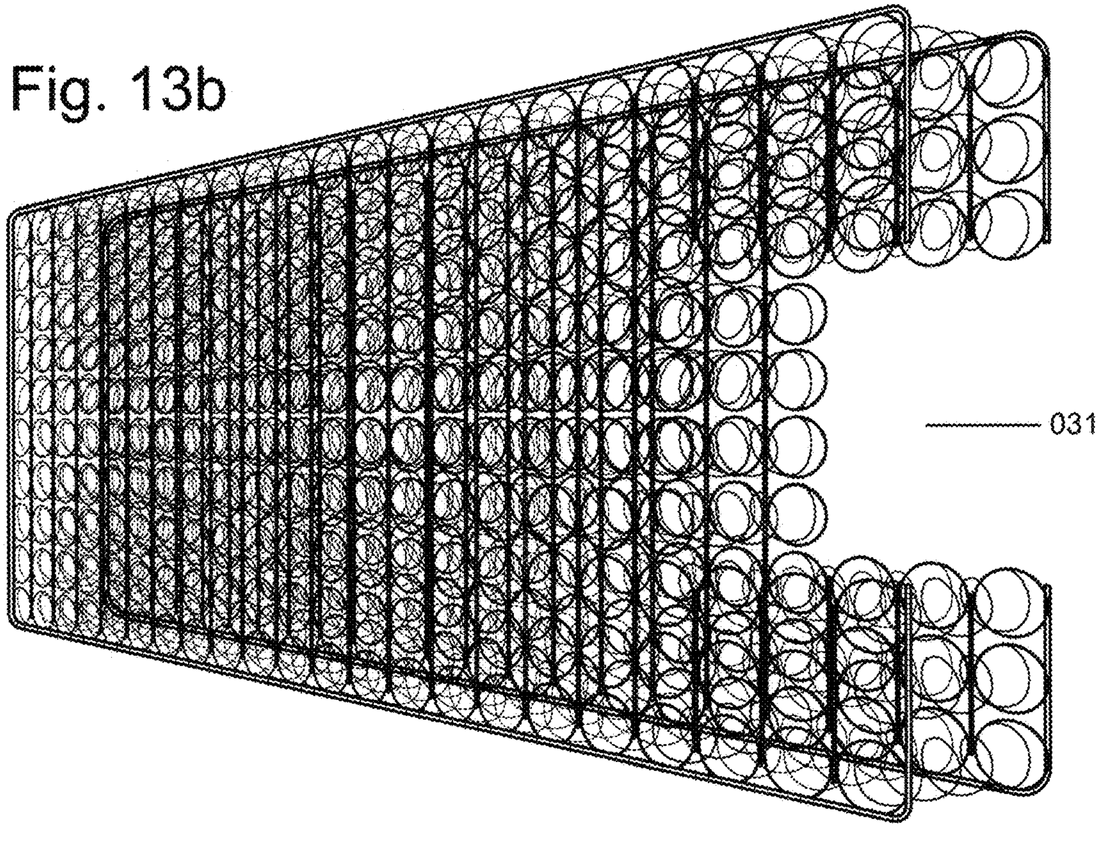

FIG. 13B is a perspective view of an inner spring coil cage mattress with face rest cavity.

Figure 13C:
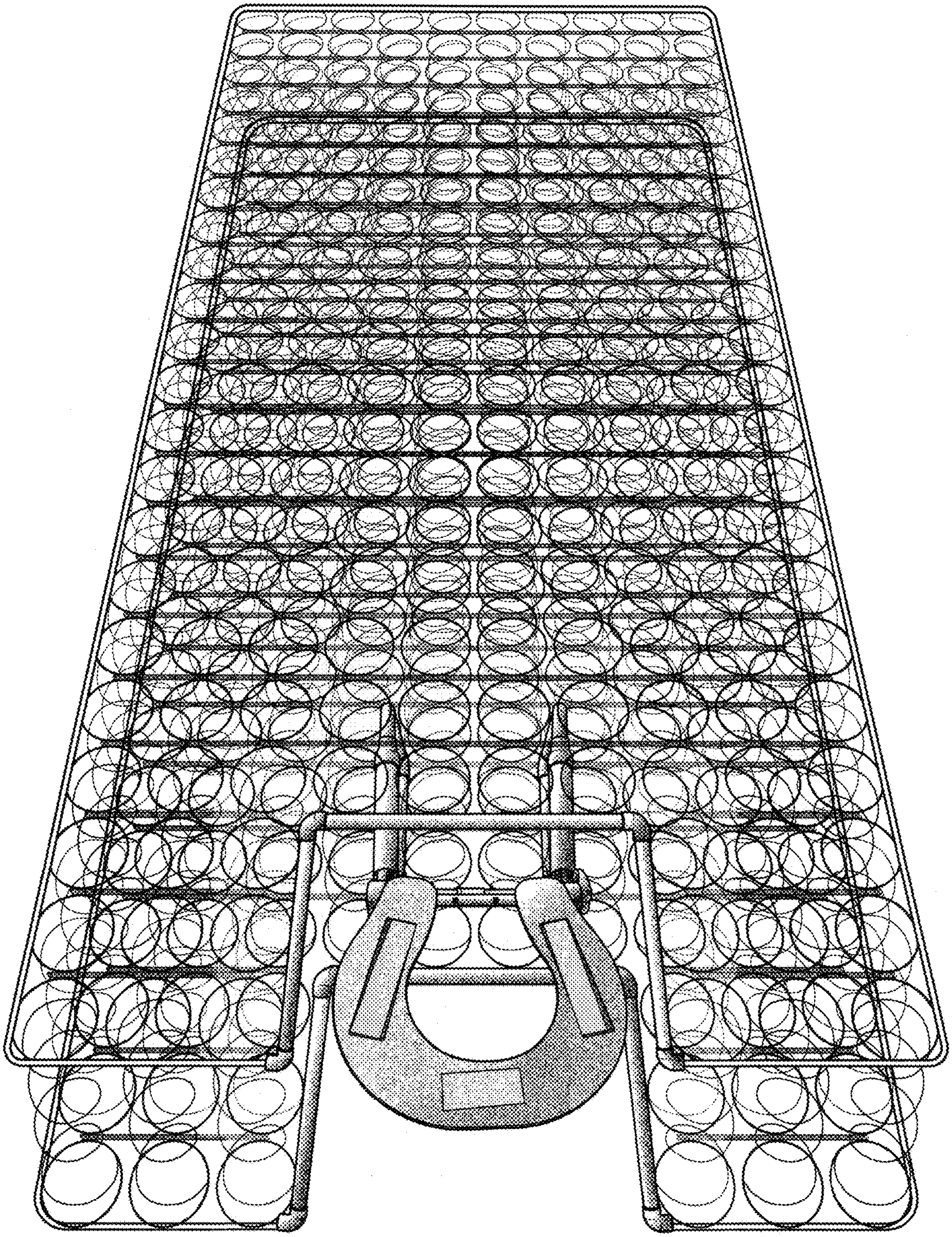

FIG. 13C is a perspective view of an inner spring coil cage mattress with face rest cavity, with top and bottom border supports installed, and an internal proning support installed.

Figure 14A:
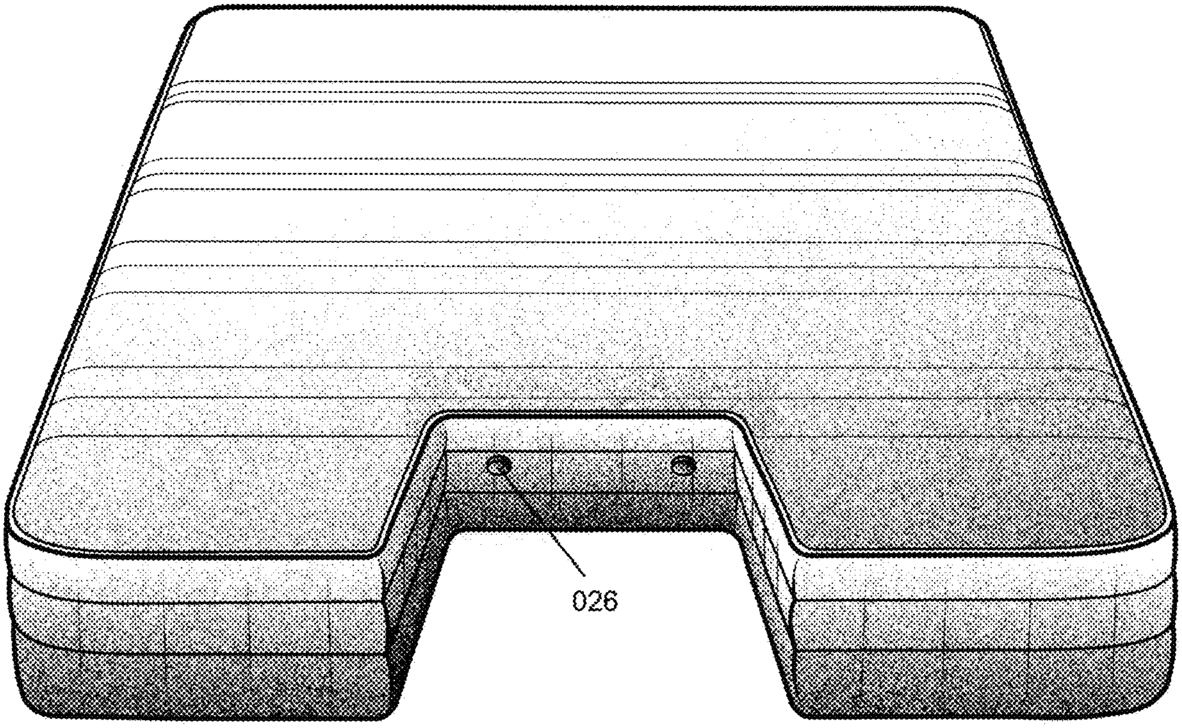

FIG. 14A is a perspective view of a completed mattress with ¾ pipe holes protruding ready to accept the face rest prongs.

Figure 14B:
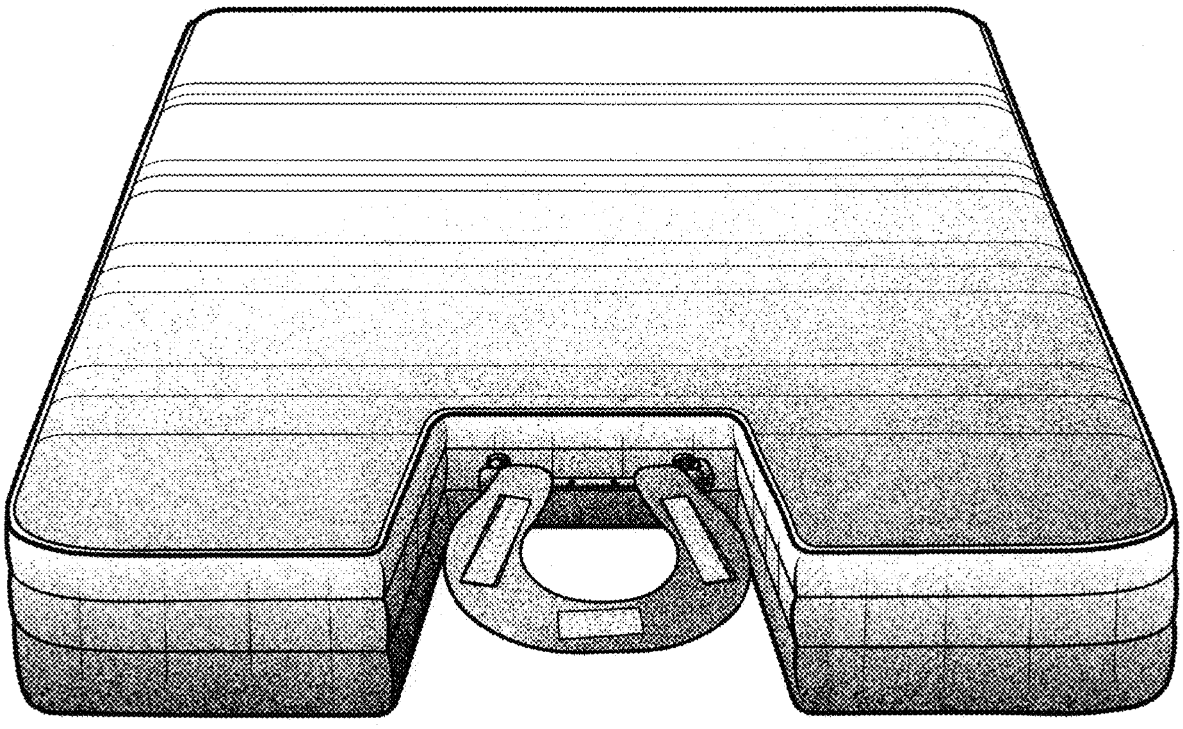

FIG. 14B is a perspective end view showing the face rest installed and the open area under the face rest.

Figure 15A:
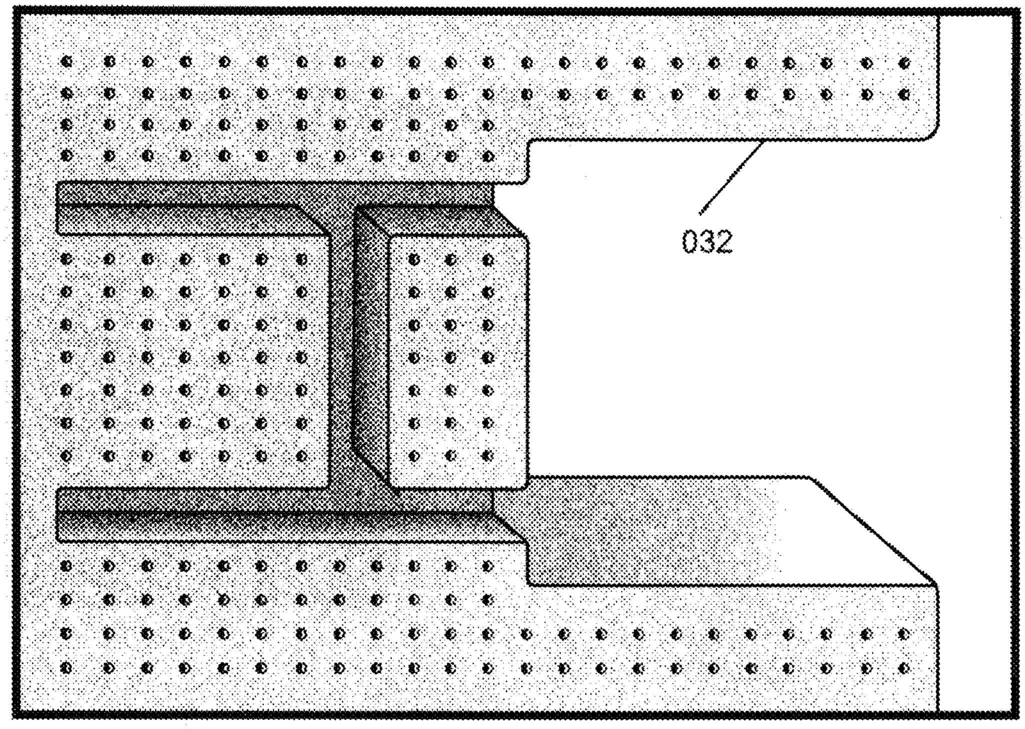

FIG. 15*a* is a perspective top down view where to saw cut the foam on a memory foam type mattress.

Figure 15B:
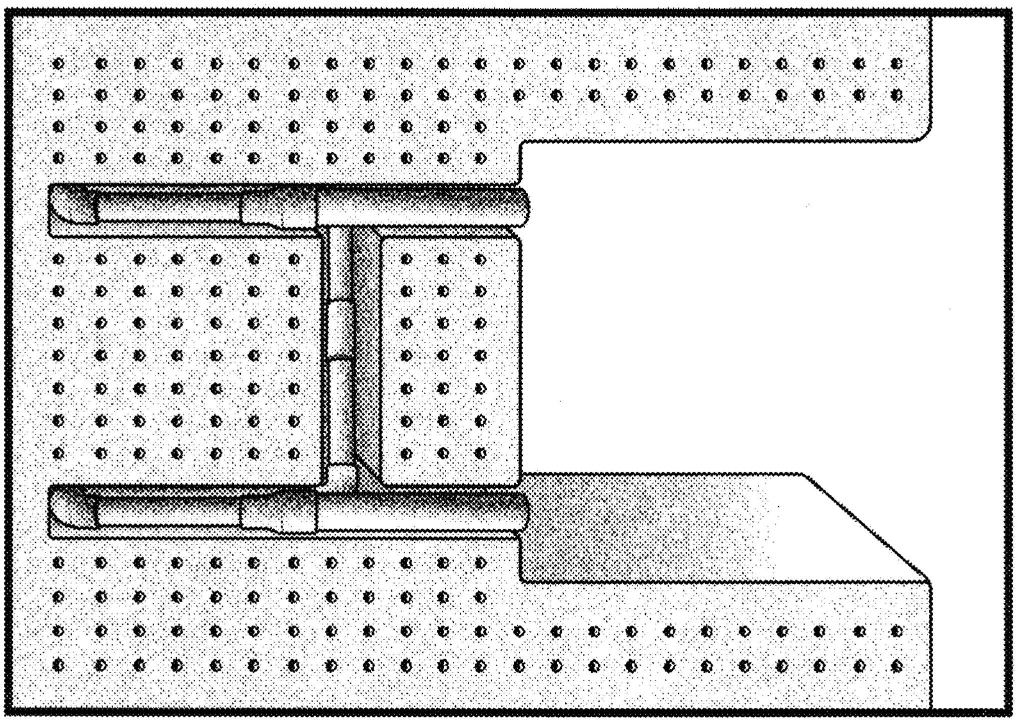

FIG. 15*b* is a perspective top down view where to install the internal face rest support base.

DESCRIPTION

Figure 1:
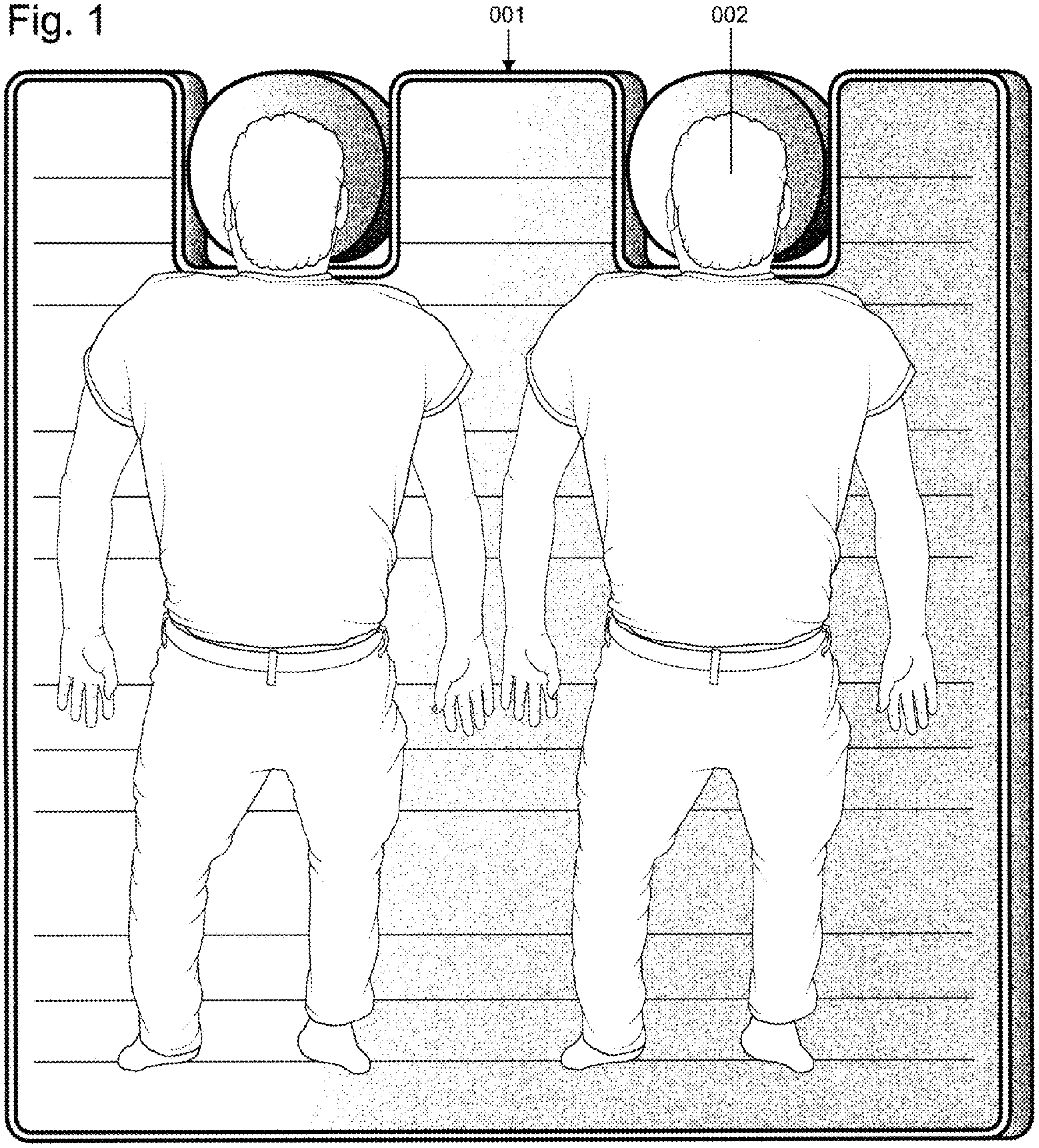
FIG. 1 is a perspective view of two individuals on the Pure Prone Positioning mattress.
Figure 2:
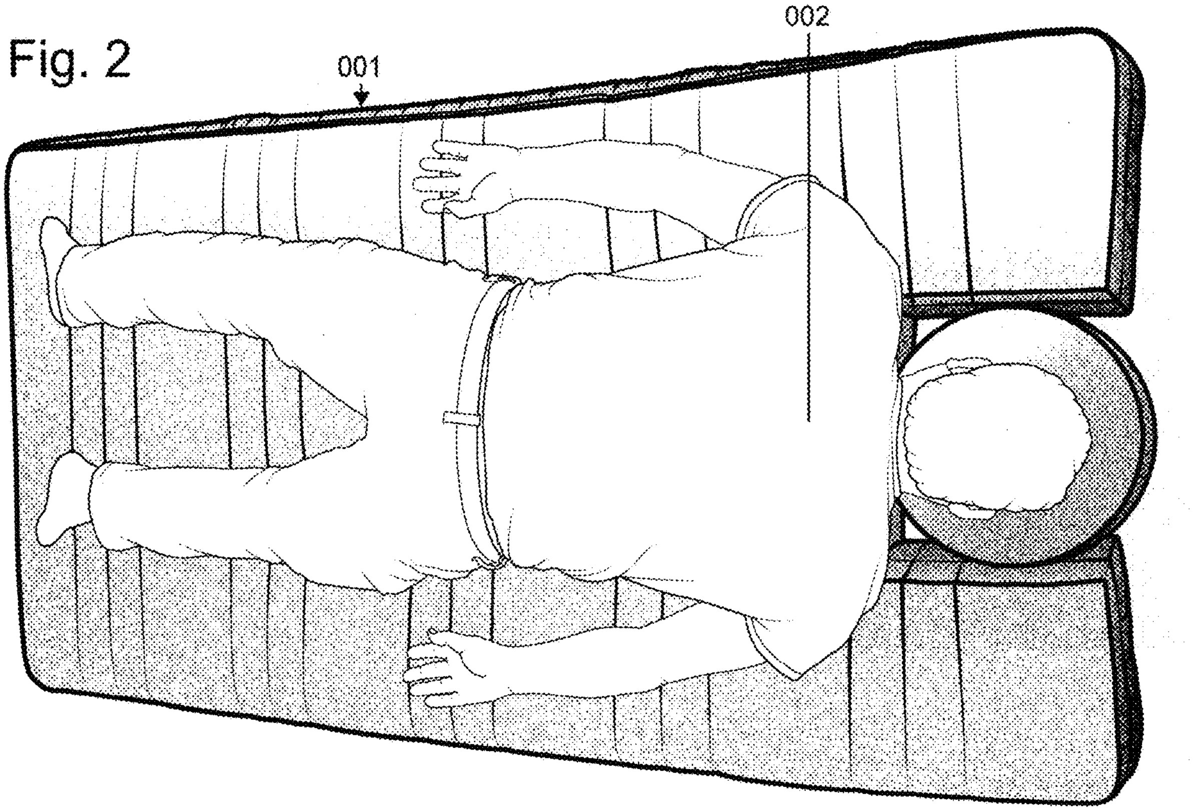
FIG. 2 is a perspective view of a single individual on the Pure Prone Positioning mattress.

Expressed in FIG. 1 and FIG. 2 is the first embodiment of the Pure Prone Positioning Mattress. Said mattress allows a person to sleep in the prone position with their face perpendicular to the mattress plane. This is accomplished by creating a cavity within the mattress plane midpoint where the head is normally positioned on the mattress, whereby a face rest cradle assembly can be located. The subjects head is cradled in a face rest assembly allowing adjustments for comfort and natural breathing, with no neck bending or cervical stress. I presently contemplate this embodiment could be made from memory foam enclosed in cloth for the mattress and face rest proning assembly a combination of a foam padded fabric enclosed face pad mounted on a lab jack scissor stand platform. However this embodiment could be made from different materials, such as plastics, leather, rubber, metals, ceramics, various foams, clothe padding, rivets, hooks, cage type coil mattress, claps, gel memory foam, neoprene, hybrid inner springs and foam, latex, pocket coils or any combination of materials or attachment hardware. The description focuses on a single sleeper but it could very well be for two sleepers.

The second embodiment of said mattress is the use of an innerspring coiled mattress for the mattress core, instead of memory foam. Padding layers are added to the outside of the coils and built up to aid in comfort. Then it is enclosed in a cloth cover. Midpoint where the head is normally positioned on the mattress, a cavity of substantial size is designed for the face rest assembly. Once the assembly is in place, the subject's head is cradled in a face rest assembly allowing adjustments for comfort and natural breathing, with no neck bending or cervical stress. A face rest proning assembly a combination of a foam padded fabric enclosed face pad mounted on a lab jack scissor stand platform. The description focuses on a single sleeper but it could very well be for two sleepers.

The third embodiment of said mattress is the use of either a foam or innerspring coiled mattress for the mattress core. Midpoint where the head is normally positioned on the mattress, a cavity of substantial size is designed for the face rest assembly. In this embodiment I envision the face rest proning assembly to be attached physically to the mattress structure through an internal structure, instead of a stand-alone lab jack scissor stand platform. The face rest would be mounted on a typical face rest with prongs jutting out. The prongs would be inserted into matching holes which are connected to the face rest proning base within the mattress itself. Since the structure is internal there is more room for medical tubing and other devices to be used.

FIG. 1 is a perspective view displaying the embodiment from above showing the pure prone position mattress (001) and two humans (002) sleeping on it. This description focuses mostly on one human for illustrative purposes, but a mattress could be made for two or more people.

FIG. 2 is a perspective view displaying the embodiment from above showing the pure prone position mattress (001) and one human (002) sleeping on it.

Figure 3:
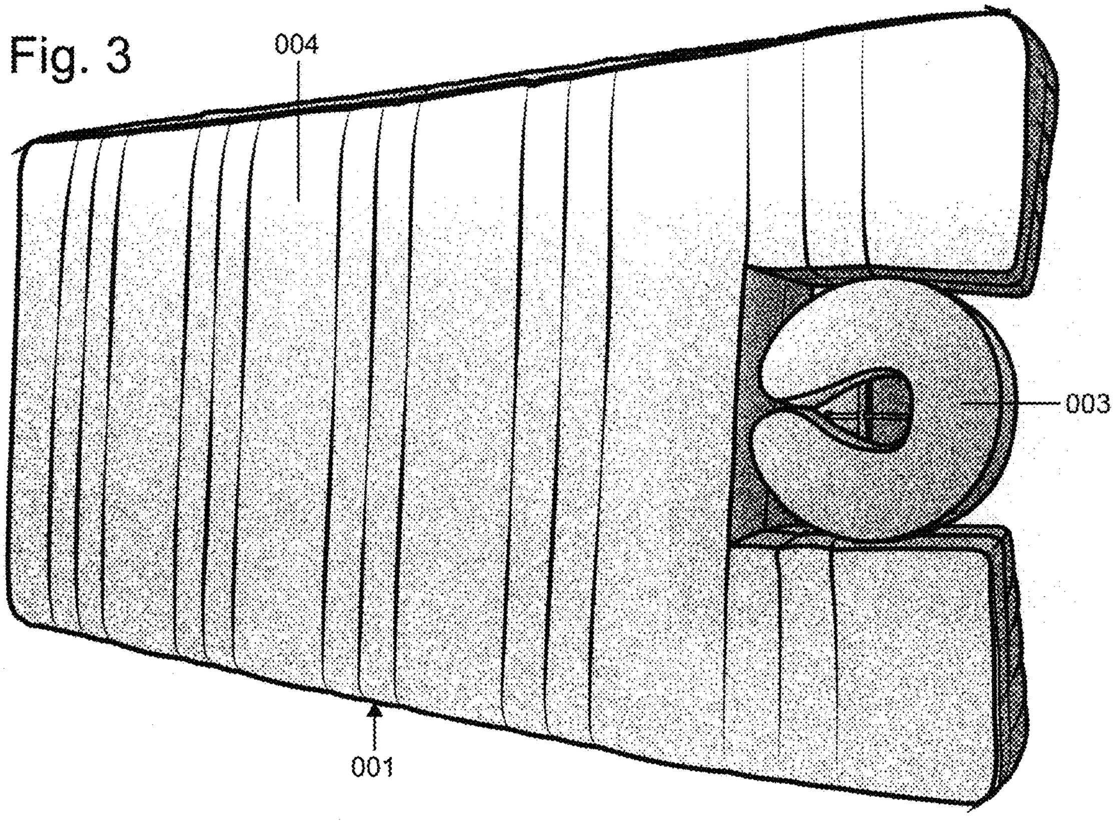
FIG. 3 is a perspective view of the Pure Prone Positioning mattress and the face rest assembly in sleeping position.

FIG. 3 is a perspective view taken from above showing the memory foam mattress (004), the Face Rest Proning Assembly (003). It illustrates the embodiment of the proning face assembly rest sitting within the footprint of the mattress.

Figure 4:
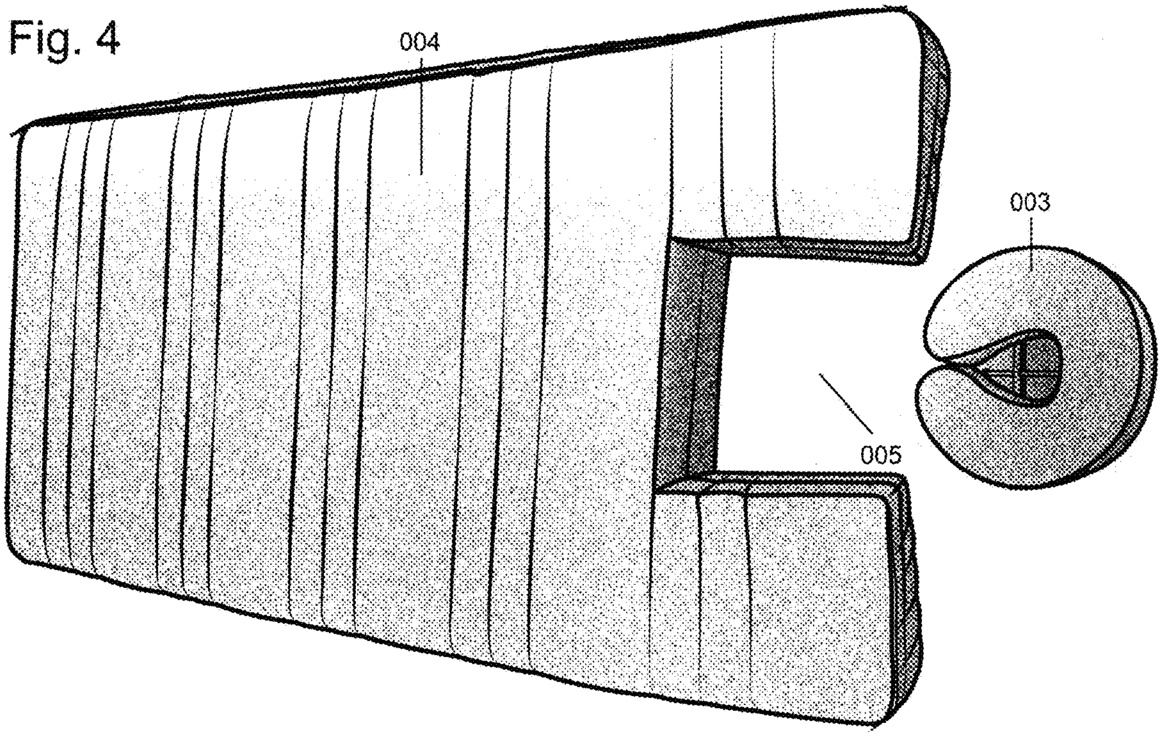
FIG. 4 is a perspective view of the Pure Prone Positioning mattress, with the face rest assembly separated visually.

FIG. 4 is a perspective view taken from above showing the Face Rest Proning Assembly (003) and the memory foam mattress enclosed in a cloth cover, (004). Here one see's the final shape of the foam mattress with a cavity (005) for the face rest proning assembly. This is created by taking a 60 by 39-inch piece of memory foam and at the midpoint at one end cut out a 13 inch by 13 inch square with reciprocating foam saw. Once the cavity is cut a fabric top, bottom, and side are installed and sewn together enclosing the foam.

Figure 5:
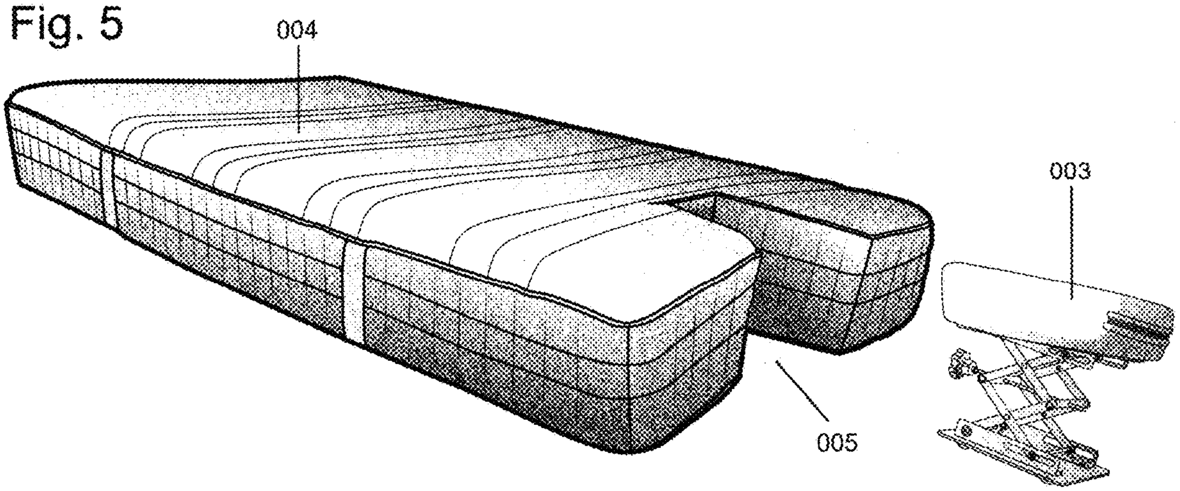
FIG. 5 is perspective orthogonal view of the Pure Prone Positioning mattress and face rest assembly.

FIG. 5 is a perspective orthogonal view taken from the side showing the mattress (004) and the face rest proning assembly (003), and the face rest cavity (005).

Figure 6:
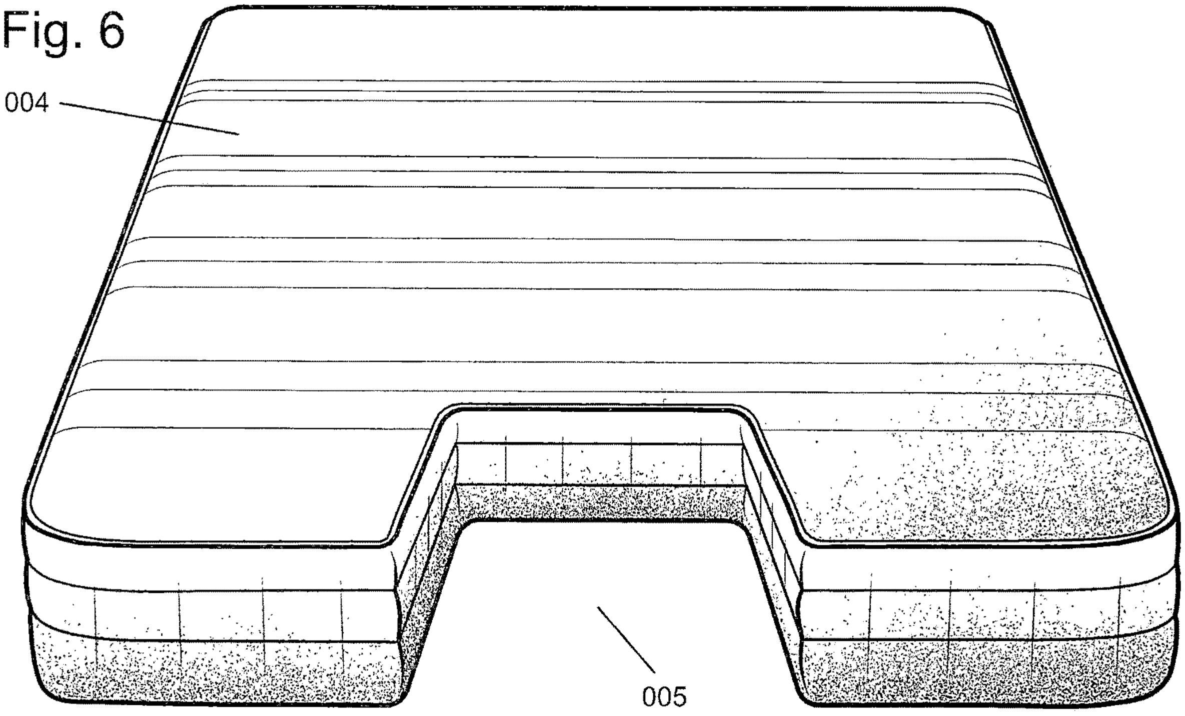
FIG. 6 is a perspective view of the cut out for the face rest assembly at the head of the Pure Prone Positioning mattress.

FIG. 6 is a front perspective view taken from the head portion of the mattress (004). The view reveals the depth and placement of the face rest proning assembly cavity (005).

FIG. 7*a* is a perspective side view of the face rest proning assembly (003). (006) molded face rest foam pad enclosed in cloth, (007) molded plastic face rest platform, (009) hook Velcro, (010) 4 each 90-degree bracket 6 inch long 1 inch by 1 inch with a slot 3 inches by ⅜ inches, (011) are 4 each ½-inch screws nuts and plastic washers, (012) 2 each barrel nut, (013) 8 inch plastic handle bolt, (014) 8 each pieces of sheets metal 6 inches long ½ inch wide, (015) 4 each clevis pins, (016) 4 each rivets, (017) is 2 each of 7 inch ¼ thread screw with plastic handle, (018) 2 each ¾ inch screws nuts washers, (019) 1 each 8 inch by 8 inch sheet metal plate, (020) 4 each screws washers with nuts encased in rubber.

FIG. 7*b* is a perspective exploded side view of the face rest proning assembly (003). (006) molded face rest foam pad enclosed in cloth, (007) molded plastic face rest platform, (008) loop Velcro, (009) hook Velcro, (010) 4 each 90 degree bracket 6 inch long 1 inch by 1 inch with a slot 3 inches by ⅜ inches, (011) are 4 each ½ inch screws nuts and plastic washers, (012) 2 each barrel nut, (013) 8 inch plastic handle bolt, (014) 8 each pieces of sheets metal 6 inches long ½ inch wide, (015) 4 each clevis pins, (016) 4 each rivets, (017) is 2 each of 7 inch ¼ thread screw with plastic handle, (018) 2 each ¾ inch screws nuts washers, (019) 1 each 8 inch by 8 inch sheet metal plate, (020) 4 each screws washers with nuts encased in rubber.

FIG. 8 is a perspective view face rest cavity border supports. All spring mattresses have a wire border for stability, in this embodiment the face proning cavity is created by using a chop saw to cut a 13-inch piece of the top and bottom wire border at the midpoint. From here using wire snips remove 13 inches of springs. Three pieces of ⅜ inch pipe (022) are cut to 12 inches and then soldered together with four 90 degree angles (021) as illustrated. This creates the face rest cavity border supports. Epoxy into place.

FIG. 9 is a perspective view of the internal face rest support base in two pieces for installation. For spring mattresses, the face rest proning base would be unable to be installed in one piece through all of the coils. Instead, it is fabricated in two pieces then inserted in through the coils. Once in place the two pieces are epoxy glued together creating a single structure. It is then secured to adjacent springs with 14-gauge wire in four points.

FIG. 10 is a perspective view of the internal face rest support base. This is fabricated by cutting ⅜ pipe into 2 each 8 inch pieces (023), 2 each 4 inch pieces (024), 2 each 3 inch pieces (025), then cut ¾ inch pipe 2 each 7 inch pieces (026), welded together with 6 each 90 degree fittings (027) and 2 each expanders from ⅜ to ¾ inch (028), 1 each ⅜ coupling (029).

FIG. 11 is a perspective view of a traditional face rest for a massage table with mounting prongs for inserting into a massage table. In this view it shows the face rest hook Velcro (009).

FIG. 12 is a perspective view of the internal face rest support base connected to a massage table face rest. In the figure the face rest is in the elevated position illustrating longitudinal adjustment.

FIG. 13*a* is a perspective view of a coil cage mattress with border wire noted. Measurement is 39 inches wide by 60 inches long.

FIG. 13*b* is a perspective view of a coil cage mattress with face rest cavity cut out of the coils (031).

FIG. 13*c* is a perspective view of a coil cage mattress with face rest cavity, with top and bottom border supports installed, and an internal proning support base installed. As the noted connection of the border wire and the border wire support it is exposed keeping it level the coil planes and then epoxied and wire into place with 14-gauge wire.

FIG. 14*a* is a perspective view of a completed mattress with ¾ pipes (026) protruding from the face rest proning base ready to accept the face rest prongs.

FIG. 14*b* is a perspective end view of a completed mattress showing the face rest installed and the open area under the face rest.

FIG. 15*a* is a perspective top-down view where to saw cut the foam on a memory foam (032) type mattress. Once it's cut you must back fill with foam and then contact cement.

FIG. 15*b* is a perspective top-down view where to place the internal face rest base support. Once installed back fill with foam and then contact cement.

The above spring mattress embodiment is focused on a Bonnell coils, but it could easily be used for offset coils, continuous coils, pockets coils, or a mixed/hybrid of, latex on top of coils, memory foam on top of coils, memory foam mixed with latex on top of coils, latex, memory foam, and coils on top of polyfoam.

REFERENCE MATERIALS

001 Pure prone position mattress
002 Human
003 Face Rest Proning Assembly
004 Memory foam enclosed in fitted cloth
005 Face rest proning assembly cavity

006 Memory foam cloth enclosed face rest massage table pillow
007 Molded plastic face rest platform
008 Loop Velcro
009 Hook Velcro
010 4 each 90-degree bracket 6 inch long 1 inch by 1 inch with a slot 3 inches by ⅜ inches
011 4 each ½-inch screws nuts and plastic washers
012 2 each barrel nut
013 8-inch plastic handle bolt
014 8 each pieces of sheets metal 6 inches long ½ inch wide
015 4 each clevis pins
016 4 each rivets
017 2 each of 7-inch ¼ thread screw with plastic handle
018 2 each ¾-inch screws nuts washers.
019 1 each 8-inch by 8 inch sheet metal plate.
020 4 each screws washers with nuts encased in rubber
021 4 90 degree angles ⅜-inch
022 3 pieces of ⅜-inch pipe (022) are cut to 12 inches
023 2 each support members ⅜ 8-inch pieces
024 2 each support members ⅜ 4-inch pieces
025 2 each support members ⅜ 3-inch pieces
026 ¾ inch pipe 2 each 7-inch piece support members
027 6 each support members 90-degree fittings
028 2 each expanders from ⅜ to ¾ inch
029 1 each ⅜ coupling
030 coil cage mattress
031 coil cage mattress with face rest cavity
032 Memory foam
As needed epoxy glue

Operation

In operation before lying down, one adjusts the massage table pillow to their face at the same time they affix it to the plastic horseshoe shaped 007 with hook Velcro on the face rest proning assembly. Once in place the person lays with their face in the face rest proning assembly. From there they reach into the cavity and turn the plastic handle to adjust the height of the face rest. At this point the bed is ready for sleep. The person now lays on the PPP mattress and positions their head on the face rest proning assembly. Gravity works in the person's favor as the tissue that normally collapses is now held in place by gravity.

The face rest proning cavity combined with the face rest proning assembly creates a gap between the top edges of the mattress and the face rest pillow. This gap allows exhaled air to be dissipated throughout the room. The structure under the face rest pillow is open which also allows ease of transfer throughout the room. This gap also protects a sleeper's head from inadvertently rolling off the mattress plane. If a person turns over in the middle of night their head would still be supported by either the FPA or the main mattress. These two factors allow a sleeper to be medically sedated.

If the PPP mattress has a pillow and bed spread the FPA is undetectable: The bed appears to the eye to be a regular bed. All they need to do is lay on the bad supine or on their side, when they are ready to sleep prone, simply roll over while pulling the pillow to the side. Now the FPA is exposed and the sleeper puts their face in it and goes to sleep. This minimal movement is important, if this was a massage table you would expend considerable energy to wiggle down to where you could use your hands to roll over making it hard to fall back asleep.

In one embodiment the FPA is attached to the mattress. This would create more space under the proning pillow which would allow for medical tubing and sensors to be placed. It would have no effect on air exchange but the extra tubing space would be helpful. COVID patients are regularly proned and many have been intubated before being put into a medically induced coma. The tubing for an intubated patient is extensive and the added space will aid in the treatment.

A sleep study mattress is one of the embodiments I foresee. An important part of a sleep study is the way your chest moves and the devices used to detect the movement. In a polysomnogram (overnight sleep study) an elastic band is affixed around a patient's chest to measure breathing. The device that collects the data sits on the front of the chest it is hard plastic and sticks out almost 2 inches. It is very difficult to sleep on your stomach with this, a simple solution would be to carve a small cavity out of the mattress to fit where this plastic box is. In this embodiment a patient would be able to roll over and the plastic box would fit into the cavity. In the current take home sleep study there is no way to sleep conformably on one's stomach.

CONCLUSIONS, RAMIFICATIONS, AND SCOPE

Conclusions

After reading the description, the reader will see that at least one embodiment of the pure prone positioning mattress provides therapeutic value like no other mattress. This mattress can significantly reduce mild to medium OSA. The unique mattress shape combined with a face rest proning device allows a person to sleep with their face perpendicular to the mattress plane. With their head and neck in a neutral position gravity keeps their airway open allowing normal respiration. Additionally therapy compliance has been shown to be an issue with many sleep aids. With the PPP mattress it sets on the same platform as a regular bed and is switchable from supine (back) to prone (stomach) in a quick turn and a pull of the pillow to the side.

Ramifications

The ramifications are that the PPP mattress has other uses and advantages in that:

1. It permits production of PPP mattresses without any special equipment;
2. Fits on regular size beds no need to create new headboard frame or footboard;
3. Being self-contained (no headboard or footboard) the PPP mattress can be used in emergency situations such as medical transport;
4. Burn patients with back burns can be medicated and sleep prone;
5. Needs no electric power to work unlike CPAP;
6. Bed appears like a regular bed;
7. Aids in detached retina reattachment surgery, lengthy proning up to three weeks;
8. Less CPAP pressure is required when sleeping prone.
9. Currently longitudinal adjust is accomplished through a hand turned knob, future will be a hydraulically activated servo-unit.

Scope

While my above description contains many specifics, these should not be construed as limitations on the scope but rather as an exemplification of one or more embodiments thereof. Many variations are possible. For example, I presently contemplate the PPP mattress to be made of memory foam enclosed in a cloth bag, with the face proning assembly not connected to the mattress but standing independently. Future PPP mattress will be made with the face proning assembly connected to an internal structure within the mattress. This will open up a lot of space under the face rest pillow for medical devices, tubing, intubating and patient monitoring sensors.

Accordingly, the scope should be determined not by the embodiment illustrated but by the appended claims and their legal equivalents.

I claim:

1. A mattress sleeping surface combined with a face rest assembly configured to support a user in a prone position, comprising:

a mattress comprising:

a planar pad wherein the planar pad comprises a bottom edge, left and right exterior edges perpendicular to said bottom edge, and a top edge, wherein a first portion of said top edge, extending from said left exterior edge to a point between said left exterior edge and a quarter-point of said top edge is parallel to said bottom edge, wherein a second portion of said top edge, extending from a quarter-point is perpendicular to said bottom edge, wherein a third portion of said top edge, extending from a quarter-point is parallel to said bottom edge, wherein a fourth portion of said top edge, extending from a quarter-point is perpendicular to said bottom edge, wherein a fifth portion of said top edge, extending from a quarter-point is perpendicular to said bottom edge, wherein a sixth portion of said top edge, extending from a quarter-point is parallel to said bottom edge, wherein the planar pad is filled with cushioning material;

the planar pad further comprising a face rest cavity configured to accept the face rest assembly within a footprint of the planar pad;

the face rest assembly comprising:

a face rest base and a face rest platform connected to the base, the face rest platform being configured to support a head of a user in a prone position; the face rest base being integrally connected to the planar pad via a left support member and a right support member, both support members configured to extend parallel to the top edge of the planar pad and further inside the planar pad within the cushioning material, wherein the support members enter the planar pad at a location proximally rear to the face rest cavity and at a location vertically central with respect to the total height of the planar pad supporting an external face rest assembly.

2. The mattress sleeping surface according to claim 1, further comprising a left and a right side, wherein the left and the right side of the sleeping surface are respectively adjacent to a left and a right side of the mattress.

3. The mattress sleeping surface according to claim 2, further comprising: a left side of the face rest base having a first support member parallel to the top edge of the planar pad and connected to a coupling, wherein the coupling is connected to a first angle member, wherein the first angle member is connected to a second support member and a second angle member, wherein the second support member is parallel to the left side of the mattress, and wherein the second angle member is connected to a third support member and a third angle member, and wherein the third support member is perpendicular to a mattress plane, and wherein the third angle member is connected to a fourth support member, where in the fourth support member is parallel to the left edge of the planar pad.

4. The mattress sleeping surface according to claim 2, further comprising: a right side of the face rest base having a first support member parallel to the top edge of the planar pad and connected to a coupling, wherein the coupling is connected to a first angle member, wherein the first angle member is connected to a second support member and a second angle member, wherein the second support member is parallel to the right side of the mattress, and wherein the second angle member is connected to a third support member and a third angle member, and wherein the third support member is perpendicular to a mattress plane, and wherein the third angle member is connected to a fourth support member, wherein the fourth support member is parallel to the right edge of the planar pad.

5. The mattress sleeping surface according to claim 3, wherein the end of said fourth support member extends to at least an outside of the mattress and is positioned adjacent to said second portion of said top edge and said fourth portion of said top edge.

6. The mattress sleeping surface according to claim 4, wherein the end of said fourth support member extends to at least an outside of the mattress and is positioned adjacent to said second portion of said top edge and said fourth portion of said top edge.

* * * * *